UNITED STATES PATENT OFFICE.

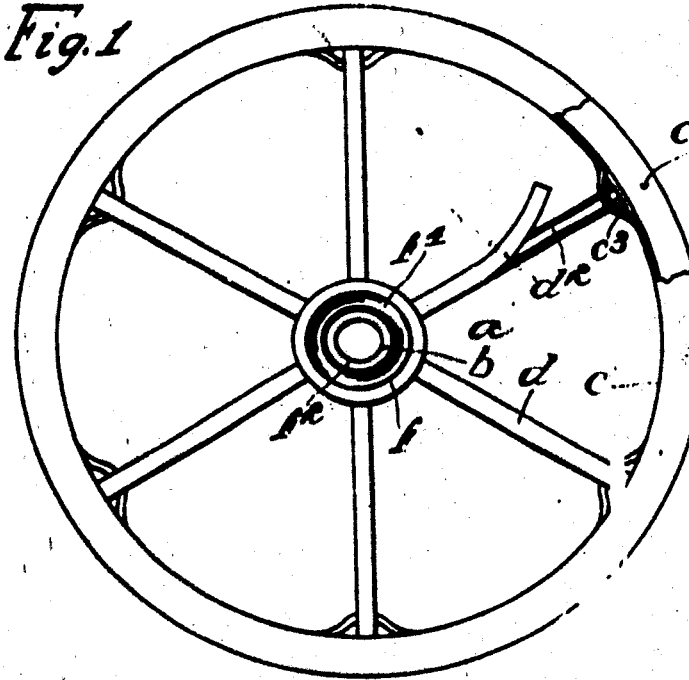

MAURICE LACHMAN, OF NEW YORK, N. Y., ASSIGNOR TO WELDED STEEL WHEEL COMPANY, OF NEW YORK, N. Y., A CORPORATION OF NEW YORK.

WHEEL.

948,997.

Specification of Letters Patent.

Patented Feb. 15, 1910.

Application filed April 29, 1909. Serial No. 492,941.

*To all whom it may concern:*

Be it known that I, MAURICE LACHMAN, a citizen of the United States, and residing at New York, in the county of New York and State of New York, have invented certain new and useful Improvements in Wheels, of which the following is a specification, such as will enable those skilled in the art to which it appertains to make and use the same.

This invention relates to vehicle wheels and particularly to wheels designed for use in connection with what are known as go-carts, perambulators and other light vehicles; and the object thereof is to provide a wheel of this class which is composed entirely of metal and which will be strong and durable; and with this and other objects in view the invention consists in a wheel of the class specified constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a side view of a wheel made according to my invention, part of the construction being broken away, Fig. 2 a sectional view looking in the direction of the arrow 2 of Fig. 1, and:—Fig. 3 a view similar to Fig. 2 but showing a modification.

In the practice of my invention as shown in Figs. 1 and 2, I provide a wheel $a$ composed of a hub $b$, a rim $c$ and spokes $d$ which connect the hub and rim. The rim $c$ is stamped from sheet metal and is provided with a groove $c^2$ adapted to receive an ordinary elastic tire not shown. The spokes $d$ are also stamped from sheet metal and are also stamped to form longitudinal grooves $d^2$ in their inner sides and this form or construction of said spokes adds to the strength thereof as will be readily understood. The spokes $d$ are arranged in pairs as shown, the spokes of each pair being connected with the ends of the hub $b$ and with the rim $c$.

The rim $c$ is provided at intervals with inwardly directed lugs or projections $c^3$ to which the spokes $d$ are secured, and in making this connection the said spokes are welded to said lugs or projections $c^3$ and to the rim $c$.

The spokes $d$ are connected with the end portions of the hub $b$ by means of inner disks or washers $e$ and outer disks or washers $f$ through which the hub passes and which are rigidly secured to said hub by welding, and the ends of the hub $b$ pass through the outer disks or washers $f$ and are provided with a swaged collar or rim $f^2$.

The disks or washers $e$ and $f$ are provided respectively with outwardly and inwardly directed flanges $e^3$ and $f^3$ between which the ends of the spokes are inserted, and said flanges are provided in their adjacent faces with apertures to receive said ends of the spokes, and in practice the disks or washers $e$ and $f$ after the ends of the spokes have been inserted between the same are firmly compressed and annular grooves $e^4$ and $f^4$ are formed therein which strengthen said disks or washers and aid in securing the ends of the spokes therebetween, and the said ends of the spokes and said disks or washers are welded together and to the hub $b$.

A wheel constructed in this manner, will possess a maximum of strength with a minimum of weight, and said wheel will, as will be understood, be strong and durable and the parts thereof will not work loose or become disconnected in any way.

In Fig. 3 I have shown a modification in which the spokes $d$ are composed of rods, the spokes of each pair being composed of single rods which are passed through the lugs or projections $c^3$ of the rim $c$, and then bent into proper shape to form the spokes, and the ends of said spokes are secured between the disks or washers $e$ and $f$ in the same manner as with the construction shown in Figs. 1 and 2. In this construction the spoke members $d$ are also welded to the lugs or projections $c^3$ of the rim $c$ and to the disks or washers $e$, and said disks or washers $e$ are welded together and to the hub $b$ and, as will be seen, the disks or washers $e$ and $f$ in both styles of construction form a part of the hub.

Having fully described my invention, what I claim as new and desire to secure by Letters Patent, is:—

1. A wheel composed entirely of metal and comprising a tubular hub, a rim and spokes arranged in pairs and which connect the hub and rim, said hub being provided at its ends with inner and outer disks through which it passes and which are setured thereto, and said disks being provided one with an inwardly directed and the other with an outwardly directed flange or rim between which the inner ends of the spokes are compressed, and said disks being also compressed to form in their outer faces grooves which form on their inner faces annular beads between which the inner ends of the spokes are also compressed.

2. A wheel composed entirely of metal and comprising a tubular hub, a rim and spokes arranged in pairs and which connect the hub and rim, said hub being provided at its ends with inner and outer disks through which it passes and which are secured thereto, and said disks being provided one with an inwardly directed and the other with an outwardly directed flange or rim between which the inner ends of the spokes are compressed, and said disks being also compressed to form in their outer faces grooves which form on their inner faces annular beads between which the inner ends of the spokes are also compressed, all the parts of the wheel being also welded together.

In testimony that I claim the foregoing as my invention I have signed my name in presence of the subscribing witnesses this 27th day of April 1909.

MAURICE LACHMAN.

Witnesses:
  REGINALD HAWLEY,
  J. W. CORRIGAN.